(12) United States Patent
Yokoyama

(10) Patent No.: US 9,946,524 B2
(45) Date of Patent: Apr. 17, 2018

(54) METHOD OF COMPILING A SOURCE CODE, STORAGE MEDIUM, AND APPARATUS

(71) Applicant: FUJITSU LIMITED, Kawasaki-shi, Kanagawa (JP)

(72) Inventor: Takuma Yokoyama, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 15/002,767

(22) Filed: Jan. 21, 2016

(65) Prior Publication Data

US 2016/0274877 A1 Sep. 22, 2016

(30) Foreign Application Priority Data

Mar. 20, 2015 (JP) ................. 2015-057212

(51) Int. Cl.
*G06F 9/45* (2006.01)

(52) U.S. Cl.
CPC . *G06F 8/51* (2013.01); *G06F 8/47* (2013.01)

(58) Field of Classification Search
None
See application file for complete search history.

(56) References Cited

U.S. PATENT DOCUMENTS

| 7,080,363 B2 * | 7/2006 | Yellin | G06F 9/44589 717/139 |
| 2013/0174131 A1 * | 7/2013 | Takeuchi | G06F 8/51 717/137 |

FOREIGN PATENT DOCUMENTS

| JP | 2-205930 | 8/1990 |
| JP | 2-240743 | 9/1990 |
| JP | 2013-140470 | 7/2013 |

* cited by examiner

*Primary Examiner* — Qamrun Nahar
(74) *Attorney, Agent, or Firm* — Staas & Halsey LLP

(57) ABSTRACT

A method of compiling a source code described by a first programming language, the method being executed by a computer and includes: specifying a function described by a second programming language different from the first programming language from the source code, the function being allowed to use one or more arguments; and first creating an instruction to store given data that causes occurrence of an error when a register is accessed due to execution of the function in an area in the register for an argument that is not set for the function in the source code among the one or more arguments.

12 Claims, 13 Drawing Sheets

```
CBS1

IDENTIFICATION DIVISION.
PROGRAM-ID. MAINCOB.
DATA DIVISION.
WORKING-STORAGE SECTION.
01 P1 PIC S9(9) COMP-5.
01 P2 PIC S9(9) COMP-5.
PROCEDURE DIVISION.
    CALL "SUBC" USING P1 P2.
    :
    :
```

```
CS1 long long int SUBC(long int *p1, long int *p2, long int *p3)
{
  *p3 = *p3 +10;
  func_a(*p3);
  return(0);
}
```

FIG. 1

CBS1

```
IDENTIFICATION DIVISION.
PROGRAM-ID. MAINCOB.
DATA DIVISION.
WORKING-STORAGE SECTION.
01 P1 PIC S9(9) COMP-5.
01 P2 PIC S9(9) COMP-5.
PROCEDURE DIVISION.
      CALL "SUBC" USING P1 P2.
          :
          :
```

CS1

```
long long int SUBC(long int *p1, long int *p2, long int *p3)
{
  *p3 = *p3 +10;
  func_a(*p3);
  return(0);
}
```

METHOD OF COMPILING A SOURCE CODE, STORAGE MEDIUM, AND APPARATUS

CROSS-REFERENCE TO RELATED APPLICATION

This application is based upon and claims the benefit of priority of the prior Japanese Patent Application No. 2015-057212, filed on Mar. 20, 2015, the entire contents of which are incorporated herein by reference.

FIELD

The embodiment disclosed herein is related to a method of compiling a source code, a storage medium, and an apparatus.

BACKGROUND

In some cases, in a source code described by a first programming language, a statement that calls a function described by a second programming language is included. When this statement is executed, the function described by the second programming language is executed. The first programming language is the common business oriented language (COBOL) language for example. The second programming language is the C language or JAVA (registered trademark) for example.

Furthermore, techniques for checking arguments set in functions described by various kinds of programming languages have been variously proposed.

As one example of the related art, Japanese Laid-open Patent Publication No. 1990-205930, Japanese Laid-open Patent Publication No. 2013-140470, and Japanese Laid-open Patent Publication No. 1990-240743 are known.

SUMMARY

According to an aspect of the embodiment, a method of compiling a source code described by a first programming language, the method being executed by a computer and includes: specifying a function described by a second programming language different from the first programming language from the source code, the function being allowed to use one or more arguments; and first creating an instruction to store given data that causes occurrence of an error when a register is accessed due to execution of the function in an area in the register for an argument that is not set for the function in the source code among the one or more arguments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1, 2, and 3 are diagrams for explaining a failure that occurs attributed to a mismatch of arguments;

DESCRIPTION OF EMBODIMENT

A description will be made about the case of compiling a source code that is described by a first programming language and includes a statement to call a function described by a second programming language (hereinafter, referred to as a "source code including a call statement of an external function" as appropriate). In the case of compiling the source code including a call statement of an external function, it is difficult to use a so-called common framework and to use compiling by the same compiler.

Here, the common framework is a framework common to the COBOL language (hereinafter, referred to as COBOL as appropriate) and the C language for example. It is noted that the framework is software that provides general-purpose functions frequently used in development of application software for example.

Due to this difficulty, when a compiler compiles the source code including a call statement of an external function, it is difficult for the compiler to provide e.g. a developer with information indicating that the number of arguments set in the external function is not correct.

Because it is difficult to provide the information indicating that the number of arguments set in the external function is not correct (referred to also as "mismatch of arguments") as above, when a failure occurs attributed to the mismatch of the arguments, it is difficult to identify the cause of the failure (referred to also as a "problematic place") and it often takes a long time to solve the failure. A concrete reason why it is difficult to identify the cause of the failure will be described with reference to FIGS. 1, 2, and 3.

In one aspect of the present embodiment, identification of the cause of the failure is made easy.

[Related Art]

Figure 2:
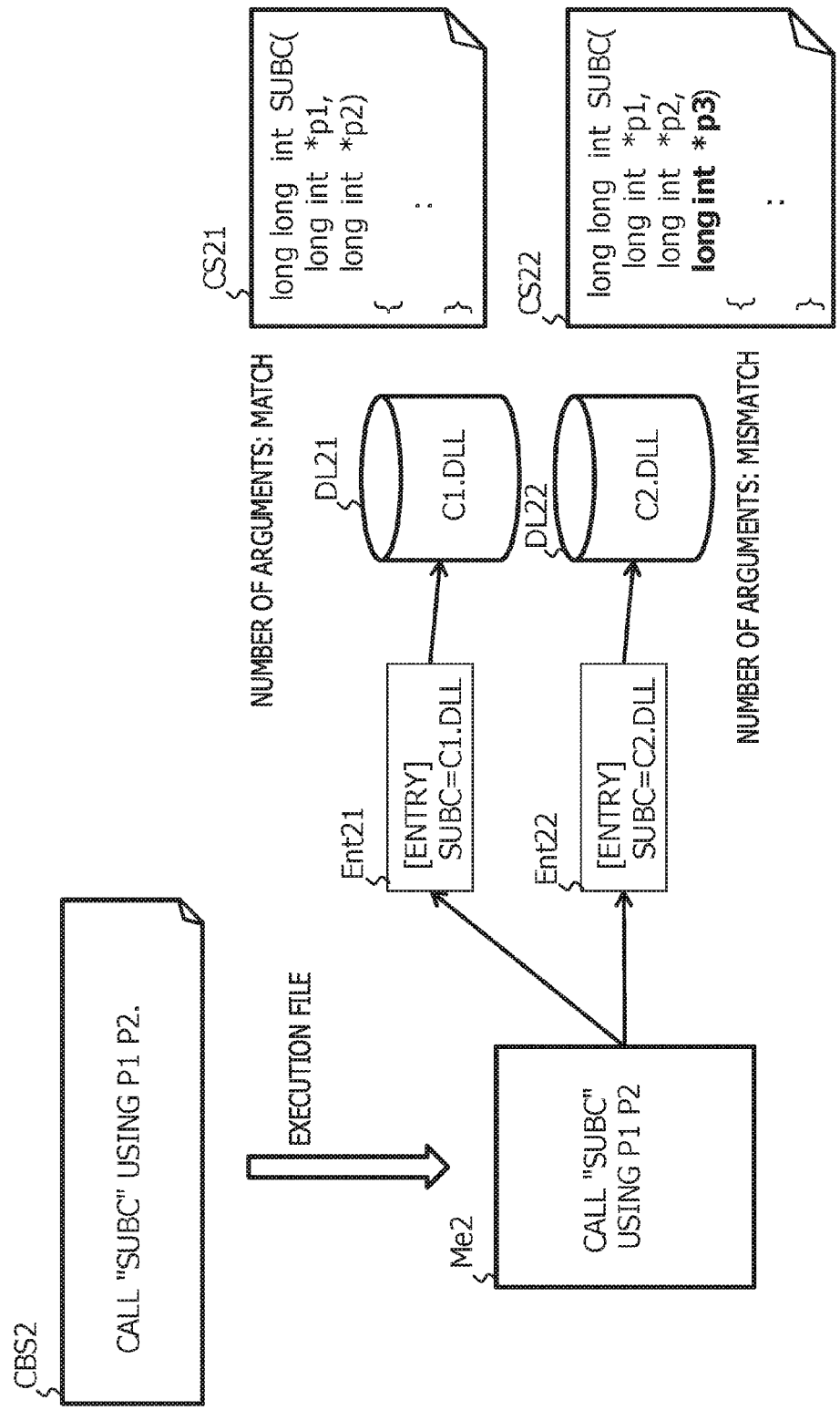
Figure 3:
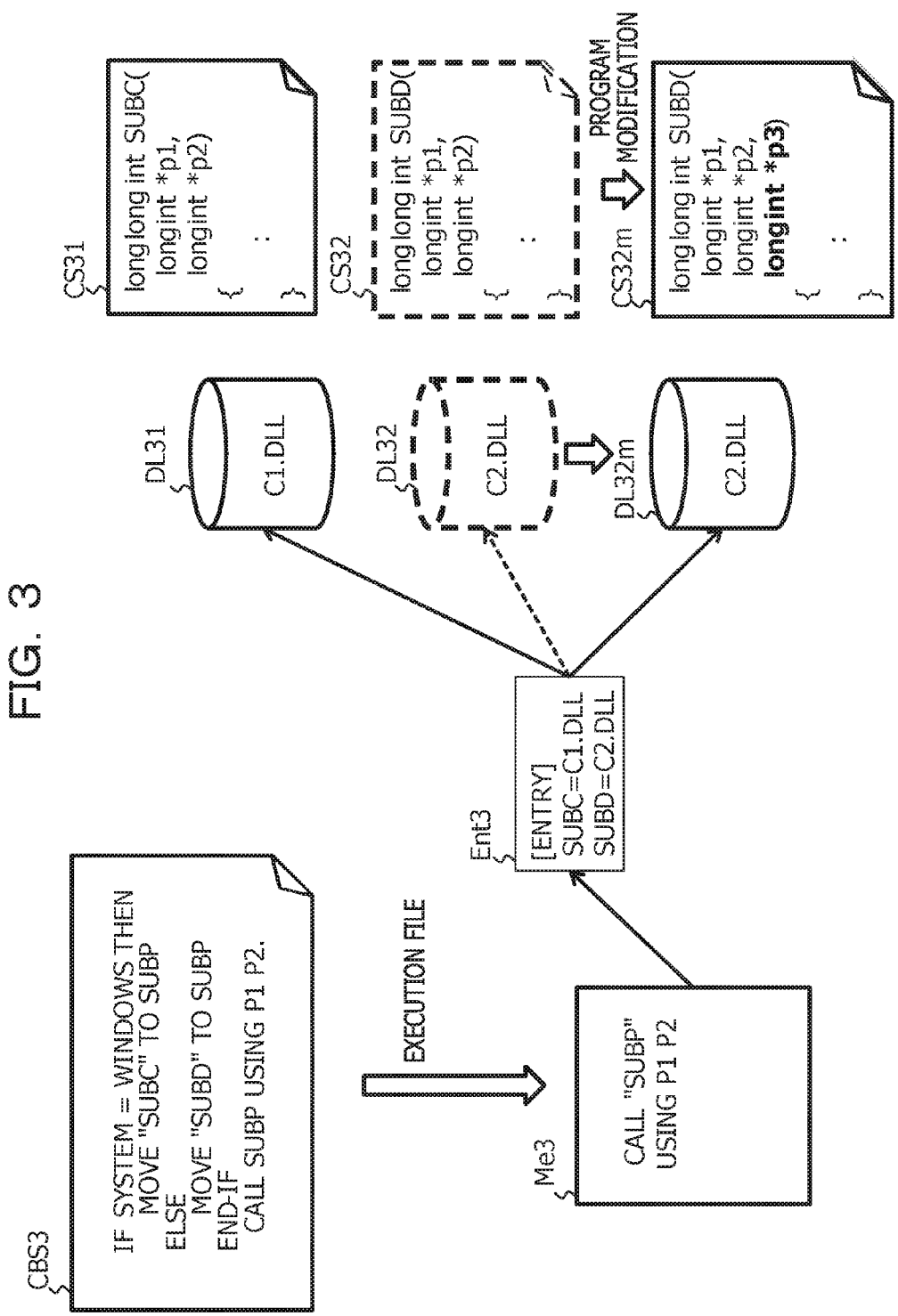

FIGS. 1, 2, and 3 are diagrams for explaining a failure that occurs attributed to a mismatch of arguments (referred to also as parameters). In the following description of the drawings, the same element is given the same symbol and description of elements described once is omitted.

FIG. 1 illustrates a source code described by COBOL (see symbol "CBS1" in FIG. 1) and a source code described by the C language (see symbol "CS1" in FIG. 1). Hereinafter, the source code described by COBOL will be referred to as the "COBOL code" as appropriate. Furthermore, the source code described by the C language will be referred to as the "C language code" as appropriate. The source code is referred to also as the "program code."

In the COBOL code CBS1, a code described as 'CALL "SUBC" USING P1 P2.' represents setting arguments "P1" and "P2" in a function "SUBC" described by the C language and calling the function "SUBC." The function "SUBC" is the above-described external function.

The C language code CS1 of the function "SUBC" described by the C language will be described. The C language code CS1 represents a C language code of the function "SUBC" in which the return value is the "long long int" type and three arguments are set. Argument 1 is the pointer of a variable "p1" of the "long int" type (see "long int *p1" in FIG. 1). Argument 2 is the pointer of a variable "p2" of the "long int" type (see "long int *p2" in FIG. 1). Argument 3 is the pointer of a variable "p3" of the "long int" type (see "long int *p3" in FIG. 1).

The function "SUBC" sets a value obtained by adding the variable "p3" and "10" to the variable "p3" (see "*p3=*p3+10;" in FIG. 1). After this setting, the function "SUBC" sets the variable "p3" as an argument in a function "func_a" and executes this function "func_a" (see "func_a(*p3);" in FIG. 1). Subsequently, the function "SUBC" returns "0" to a calling source in the COBOL code CBS1 and then ends (see "return(0);" in FIG. 1).

Here, the number of arguments of the C language function "SUBC" is three. However, in the COBOL code CBS1, as described as 'CALL "SUBC" USING P1 P2.,' only two arguments are set in the source code that calls the C language function "SUBC." In other words, the argument "p3" is not set in the COBOL code CBS1. The cause of that the argument "p3" is not set is a mistake by a programmer who described the COBOL code CBS1 (so-called bug of the program) for example.

If a mismatch exists between the number of arguments set in calling a C language function and the number of arguments desired to be set in this C language function, various problems occur. The various problems will be described below.

The COBOL code CBS1 including such a bug is compiled and an execution file (referred to also as exe file) of a binary format described by a machine code is created, so that this execution file is executed by a computer. In the execution of this execution file, when 'CALL "SUBC" USING P1 P2.' is executed, the C language function "SUBC" is called. Here, because the argument "p3" is not set in the source code that calls the C language function "SUBC," the pointer (memory address) of the argument "p3" is indeterminate. The value set in the variable "p3" is a value stored in a memory area indicated by the indeterminate pointer. Therefore, this value is also indeterminate.

As a result, in the C language function "SUBC," the processing in which the value resulting from addition of the variable "p3" and "10" is set in the variable "p3" (see "*p3=*p3+10;" in FIG. 1) is normally executed in some cases. Then, the function "func_a" in which the variable "p3" that is the indeterminate value is set is executed in some cases (see "func_a(*p3);" in FIG. 1).

If the processing is executed, with the value set in the variable "p3" remaining indeterminate, as above, at the time of a test of the program, a malfunction occurs or the abnormal termination (referred to also as abend) of the program occurs at an unexpected place in some cases. Besides, if the processing is executed, with the value set in the variable "p3" remaining indeterminate, as above, there is a case in which a failure does not occur at the time of a test of the program and the program is shipped as a product as it is. Furthermore, after the shipment, when a user executes this program, a malfunction occurs or the abnormal termination of the program occurs at an unexpected place in some cases. This place is a place in the source code.

As described above, if the abnormal termination of a program occurs or a malfunction occurs at an unexpected place, it takes a long time to identify the cause of the occurrence thereof.

The contents of each code in the COBOL code CBS1 will be described below. "IDENTIFICATION DIVISION." is the identification division that specifies a program name and an attribute. "PROGRAM-ID. MAINCOB." specifies a program name "MAINCOB." "DATA DIVISION." indicates that the following part is the data division that defines data to be used in procedure. "WORKING-STORAGE SECTION." indicates the working-storage section that defines the data to be used in the procedure.

In "01 P1 PIC S9(9) COMP-5.," "P1" indicates a data name and the format of the data is specified by "PIC." Here, "S" indicates that the data is signed and "9(9)" indicates that the data is a nine-digit number. "COMP-5." indicates that the data is binary. In "01 P2 PIC S9(9) COMP-5.," "P2" indicates a data name. Explanation of "PIC," "S," "9(9)," and "COMP-5." is the same as the above explanation. "PROCEDURE DIVISION." is the procedure division that describes processing.

Even in the case in which a called function is dynamically executed, if a mismatch exists in the number of arguments, a failure occurs when this function is called as illustrated in FIGS. 2 and 3.

In FIG. 2, in a COBOL code CBS2, 'CALL "SUBC" USING P1 P2.' is described. An execution file Me2 of COBOL is created from the COBOL code CBS2 (see "execution file").

The COBOL execution file Me2 represents execution of 'CALL "SUBC" USING P1 P2.'

Entry information will be described below. The entry information is information used when the structure of the program is a dynamic program structure. The entry information is used to specify a dynamic link library (DLL) in which execution data (binary data) of a function to be called is stored.

Entry information Ent21 indicates that the DLL in which the function "SUBC" to be called is stored is "C1. DLL" (see symbol "DL21" in FIG. 2). Part of the C language code of the function "SUBC" in the DLL "C1. DLL" is indicated by symbol CS21. In the C language code CS21, the function "SUBC" is a function in which the return value is the "long long int" type and argument 1 and argument 2 are set. Argument 1 is the pointer of a variable "p1" of the "long int" type (see "long int *p1" in FIG. 2). Argument 2 is the pointer of a variable "p2" of the "long int" type (see "long int *p2" in FIG. 2).

Entry information Ent22 indicates that the DLL in which the function "SUBC" to be called is stored is "C2. DLL" (see symbol "DL22" in FIG. 2). Part of the C language code of the function "SUBC" in the DLL "C2. DLL" is indicated by symbol CS22. In the C language code CS22, the function "SUBC" is a function in which the return value is the "long long int" type and argument 1, argument 2, and argument 3 are set. Argument 1 is the pointer of the variable "p1" of the "long int" type (see "long int *p1" in FIG. 2). Argument 2 is the pointer of the variable "p2" of the "long int" type (see "long int *p2" in FIG. 2). Argument 3 is the pointer of a variable "p3" of the "long int" type (see "long int *p3" in FIG. 2).

When the COBOL execution file Me2 is executed, 'CALL "SUBC" USING P1 P2.' is executed. By the execution of 'CALL "SUBC" USING P1 P2.,' the C language function "SUBC" is called. Here, the argument "p3" is not set in the source code that calls the C language function "SUBC."

When the entry information Ent21 is specified in the execution of the COBOL execution file Me2, the DLL "C1. DLL" (see symbol "DL21" in FIG. 2) is called. In this case, the number of arguments of the C language function "SUBC" is two. Therefore, a mismatch of the arguments does not exist (see "the number of arguments: match" in FIG. 2). On the other hand, when the entry information Ent22 is specified in the execution of the COBOL execution file Me2, the DLL "C2. DLL" (see symbol "DL22" in FIG. 2) is called. In this case, the number of arguments of the C language function "SUBC" is three. Therefore, a mismatch exists in the number of arguments (see "the number of arguments: mismatch" in FIG. 2).

Next, description of FIG. 3 will be made. In FIG. 3, in a COBOL code CBS3, 'IF SYSTEM=WINDOWS THEN MOVE "SUBC" TO SUBP ELSE MOVE "SUBD" TO SUBP END-IF CALL SUBP USING P1 P2.' is described.

The contents of this description represent that a function "SUBC" in which arguments "P1" and "P2" are set is called if "SYSTEM" is "WINDOWS" and a function "SUBD" in which the arguments "P1" and "P2" are set is called if "SYSTEM" is not "WINDOWS."

An execution file Me3 of COBOL is created from the COBOL code CBS3 (see "execution file" in FIG. 3). The COBOL execution file Me3 represents execution of 'CALL "SUBP" USING P1 P2.' This function "SUBP" is the function "SUBC" if "SYSTEM" is "WINDOWS," and is the function "SUBD" if "SYSTEM" is not "WINDOWS." 'CALL "SUBP" USING P1 P2.' represents calling the function "SUBP" in which the arguments "P1" and "P2" are set.

Entry information Ent3 indicates that the DLL in which the function "SUBC" to be called is stored is "C1. DLL" (see symbol "DL31" in FIG. 3) and the DLL in which the function "SUBD" to be called is stored is "C2. DLL" (see symbol "DL32" or symbol "DL32m" in FIG. 3).

Part of the C language code of the function "SUBC" in the DLL "C1. DLL" (symbol "DL31" in FIG. 3) is indicated by symbol CS31 in FIG. 3. Furthermore, part of the C language code of the function "SUBD" in the DLL "C2. DLL" (symbol "DL32" in FIG. 3) is indicated by symbol CS32 in FIG. 3.

The functions "SUBC" and "SUBD" are functions in which the return value is the "long long int" type and argument 1 and argument 2 are set. Argument 1 is the pointer of a variable "p1" of the "long int" type (see "long int *p1" in FIG. 3). Argument 2 is the pointer of a variable "p2" of the "long int" type (see "long int *p2" in FIG. 3).

When the COBOL execution file Me3 is executed, the C language function "SUBC" is called if "SYSTEM" is "WINDOWS," and the C language function "SUBD" is called if "SYSTEM" is not "WINDOWS."

In the COBOL code CBS3, two arguments are set in the C language functions "SUBC" and "SUBD." Furthermore, in the C language code CS31, the number of arguments of the C language function "SUBC" is two. In the C language code CS32, the number of arguments of the C language function "SUBD" is two. Therefore, a mismatch of the arguments does not exist.

However, the program of a DLL is often modified through version upgrade or correction of a bug ("program modification" in FIG. 3). For example, the DLL "C2. DLL" (symbol DL32) is modified to the DLL "C2. DLL" (symbol DL32m). By the modifying, part of the C language code of the function "SUBD" in the DLL "C2. DLL" (symbol "DL32m" in FIG. 3) is indicated by symbol CS32m in FIG. 3.

The post-modification function "SUBD" is a function in which the return value is the "long long int" type and argument 1 to argument 3 are set. Argument 1 is the pointer of the variable "p1" of the "long int" type (see "long int *p1"). Argument 2 is the pointer of the variable "p2" of the "long int" type (see "long int *p2"). Argument 3 is the pointer of a variable "p3" of the "long int" type (see "long int *p3").

If an argument of a function is added in modification of a DLL as above, the programmer is desired to add the argument set in this function in the source code that calls the function to which the argument is added. In the example of FIG. 3, the programmer is desired to add argument 3 corresponding to the post-modification function "SUBD" in the code CBS3 to call the post-modification function "SUBD," to which argument 3 is added. However, if the programmer forgets this addition, the above-described mismatch of the arguments occurs.

As described above with FIGS. 1, 2, and 3, due to a mistake by the programmer, a mismatch occurs between the number of arguments set in calling a function and the number of arguments desired to be set in this function. In this case, due to this mismatch, a failure occurs when this function is called. Furthermore, it takes a long time to identify the cause of the occurrence of this failure as described above. Therefore, a compile device is provided that shortens the time until the cause of the occurrence of a failure is identified by causing the occurrence of the failure at the time of execution of a test even when a mismatch exists in the number of arguments.

Present Embodiment (Hardware Block Diagram)

Figure 4:
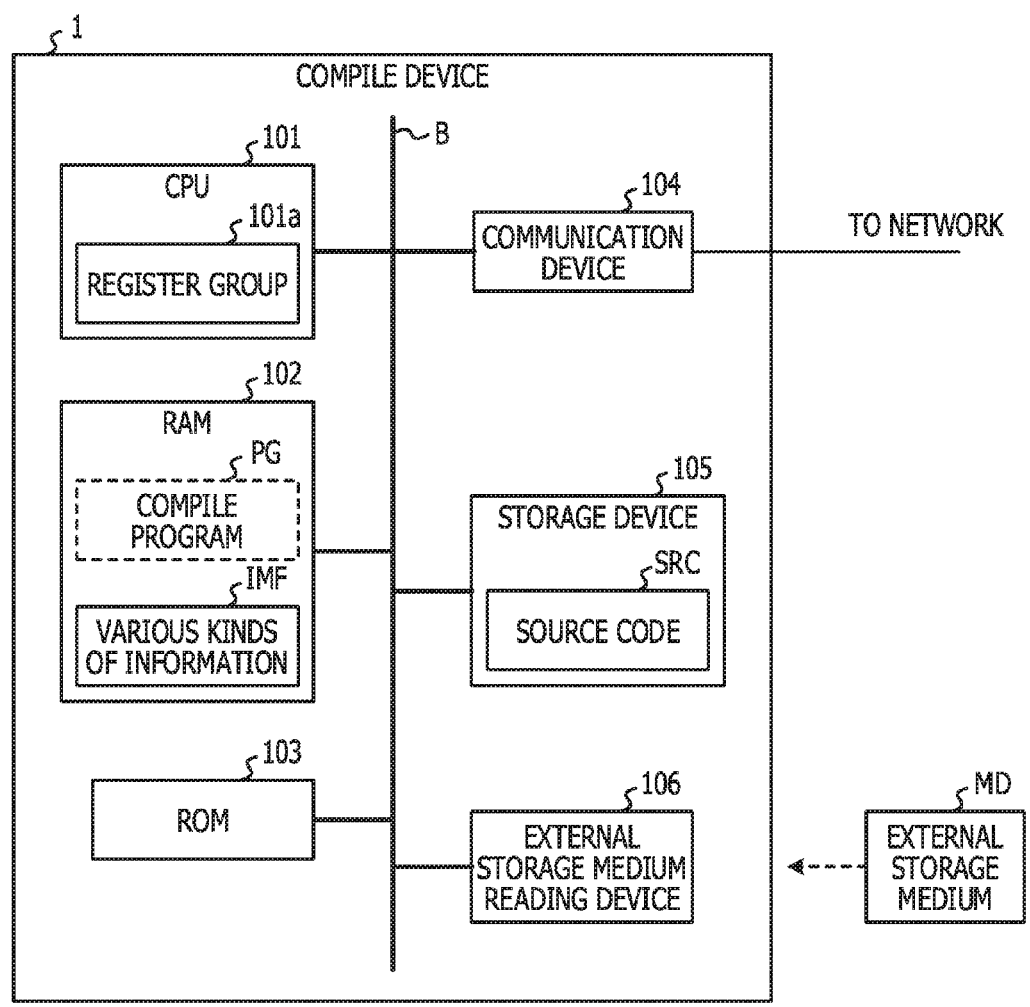
FIG. 4 is a hardware block diagram of a compile device in a present embodiment.

FIG. 4 is a hardware block diagram of a compile device in a present embodiment. A compile device 1 is a so-called computer and includes a CPU 101, a RAM 102, a ROM 103, a communication device 104, a storage device 105, and an external storage medium reading device 106 that are coupled to a bus B. The CPU is an abbreviation for "Central Processing Unit." The RAM is an abbreviation for "Random Access Memory." The ROM is an abbreviation for "Read Only Memory."

The CPU 101 is a central arithmetic processing device that controls the whole of the compile device 1. The CPU 101 includes a register group 101a.

The RAM 102 is a device that temporarily stores data and so forth created (calculated) in processing executed by the CPU 101 and the respective steps carried out by a compile program PG. The compile program is referred to also as a compiler. The RAM 102 is a semiconductor memory such as a dynamic random access memory (DRAM) for example. Furthermore, the RAM 102 stores various kinds of data, e.g. various kinds of information INF. The RAM is referred to also as a memory.

The compile program PG is a program that converts a source code described by a programming language to a machine code or an object code. The object code is a code described by an intermediate language such as a byte code.

The ROM 103 stores various kinds of data. The communication device 104 is a device coupled to a network such as a local area network (LAN). Also, the communication device 104 includes a network interface card (NIC) for example.

The storage device 105 is a data storing device such as a hard disk drive, a solid state drive, or a non-volatile semiconductor memory for example. The storage device 105 stores a source code SRC for example.

The external storage medium reading device 106 is a device that reads data stored in an external storage medium magnetic disk (MD). The external storage medium MD is a non-volatile storage medium and is e.g. a portable storage medium such as a compact disc read only memory (CD-ROM) or a digital versatile disc (DVD).

An execution file of the compile program PG is stored in the storage device 105 for example. At the time of activation of the compile device 1, the CPU 101 reads the execution file of the compile program PG from the storage device 105 and expands the execution file in the RAM 102.

The execution file of the compile program PG may be stored in the external storage medium MD. In this case, at the time of activation of the compile device 1, the CPU 101 reads the execution file of the compile program PG from the external storage medium MD and expands the execution file in the RAM 102.

(Register)

Figure 5:
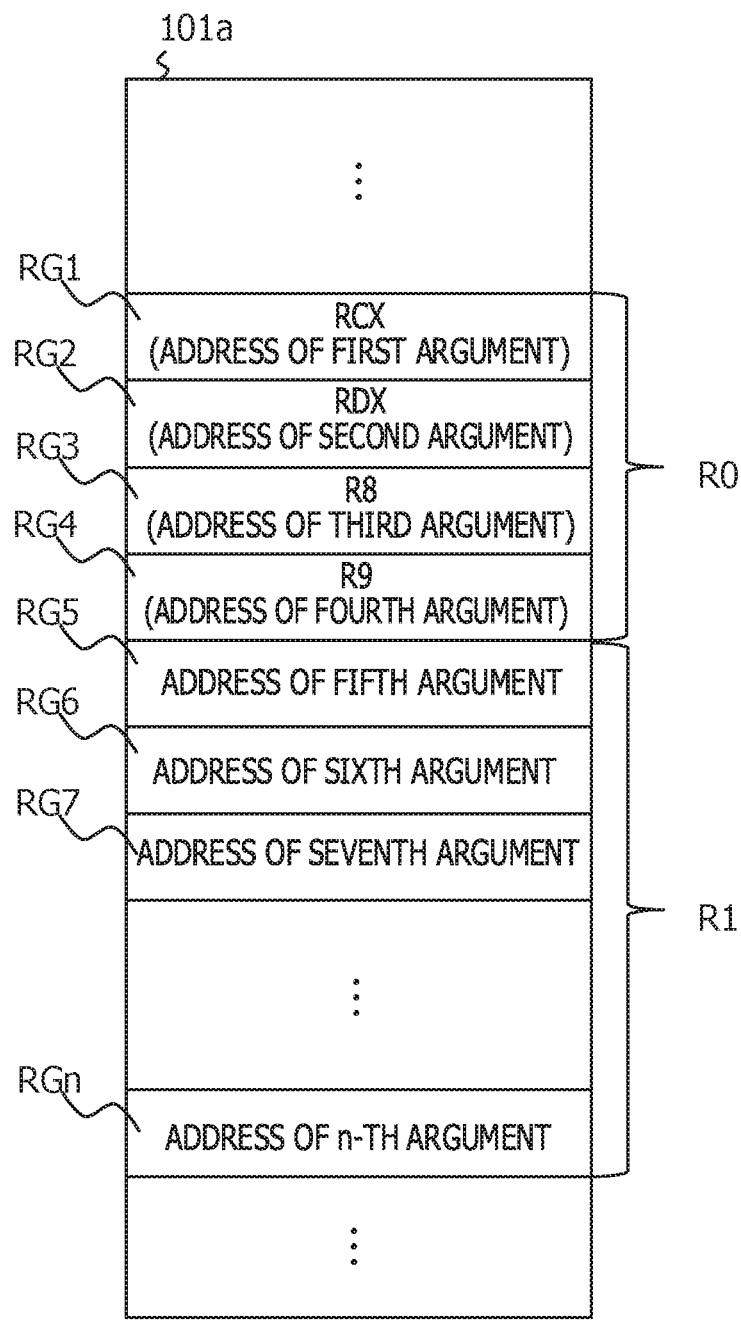
FIG. 5 illustrates an example of an area in which arguments are saved on registers or stacks.

FIG. 5 illustrates an example of an area in which arguments are saved on registers or stacks. In FIG. 5, rectangular frames represent registers in which the memory addresses (hereinafter, referred to as the "address" as appropriate) of the respective arguments are stored. A register RGm ("m" is an integer of 1 to n and "n" is an integer equal to or larger than 8) represents the register in which the address of the m-th argument of the function is stored. In FIG. 5, "RCX," "RDX," "R8," and "R9" are register names.

In other words, the register RGm is a register area in which an address indicating a memory area in which data of an argument is stored is stored. This address is an address in a RAM provided in the computer that executes the execution file of the program. The data of the argument is stored in the area in the RAM indicated by this address. This computer is the compile device 1 of FIG. 4 for example but may be another information processing device.

An area indicated by symbol R0 is a register parameter area and is usually ensured in the register group 101a. An area indicated by symbol R1 is a stack parameter area and is ensured in the register group 101a as appropriate according to the number of arguments. The registers in the register parameter area and the stack parameter area are referred to also as so-called registers for arguments.

(Software Block Diagram)

Figure 6:
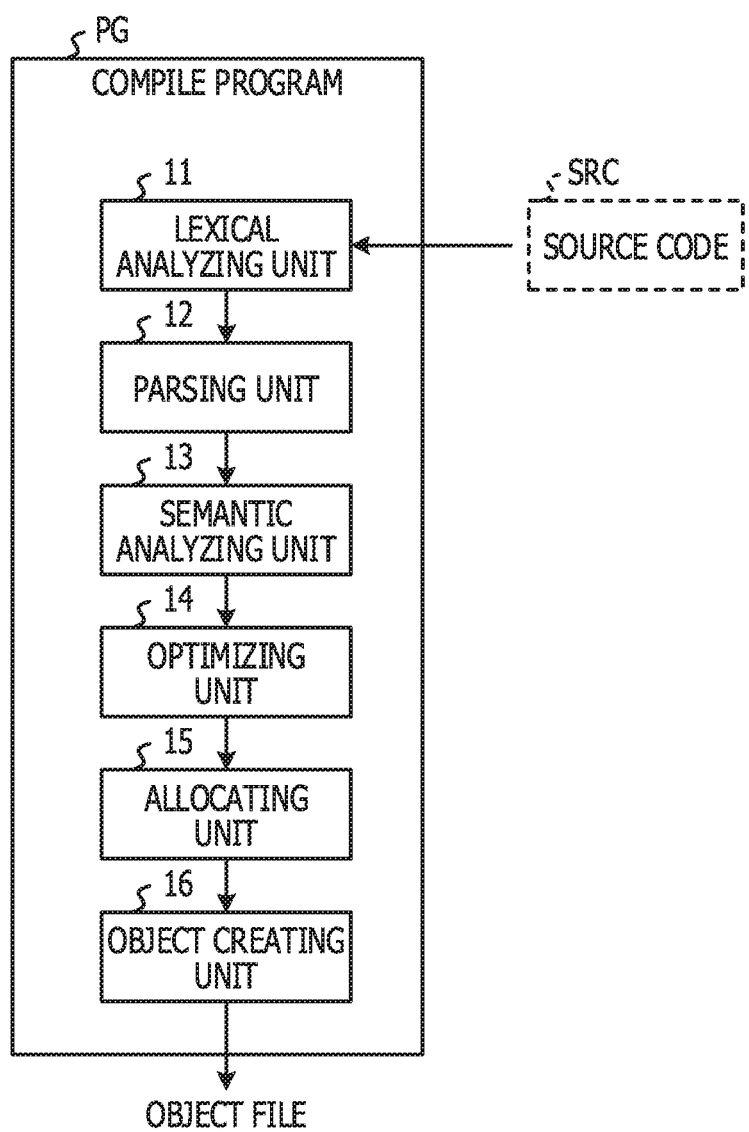
FIG. 6 is a software block diagram for explaining a compile program in FIG. 4.

FIG. 6 is a software block diagram for explaining the compile program PG in FIG. 4. The compile program PG includes a lexical analyzing unit 11, a parsing unit 12, a semantic analyzing unit 13, an optimizing unit 14, an allocating unit 15, and an object creating unit 16.

The lexical analyzing unit 11 reads out the source code SRC stored in the storage device 105 and loads the source code SRC into the RAM 102 to execute a lexical analysis on the loaded source code SRC. The lexical analyzing unit 11 divides the source code SRC into tokens (collections of characters) in this lexical analysis.

The parsing unit 12 analyzes whether the tokens obtained by the division by the lexical analyzing unit 11 comply with syntactic rules. Then, the parsing unit 12 creates parsing information indicating the analysis result and stores the parsing information in the RAM 102.

The semantic analyzing unit 13 analyzes whether the contents of the source code SRC, i.e. the lexical elements, are semantically correct. The semantic analyzing unit 13 analyzes whether an undefined variable is used for example. Then, on the basis of the parsing information, the semantic analyzing unit 13 creates intermediate information (referred to also as an "intermediate code") and stores the intermediate information in the RAM 102.

The optimizing unit 14 executes various kinds of processing in order to increase the execution speed of the program. The optimizing unit 14 converts the intermediate information to optimize the intermediate information for example. The allocating unit 15 executes register allocation on the basis of the intermediate information. The object creating unit 16 creates an object code and stores the object code in the RAM 102 or the storage device 105 as an object file.

(Flow Diagram)

Figure 7:
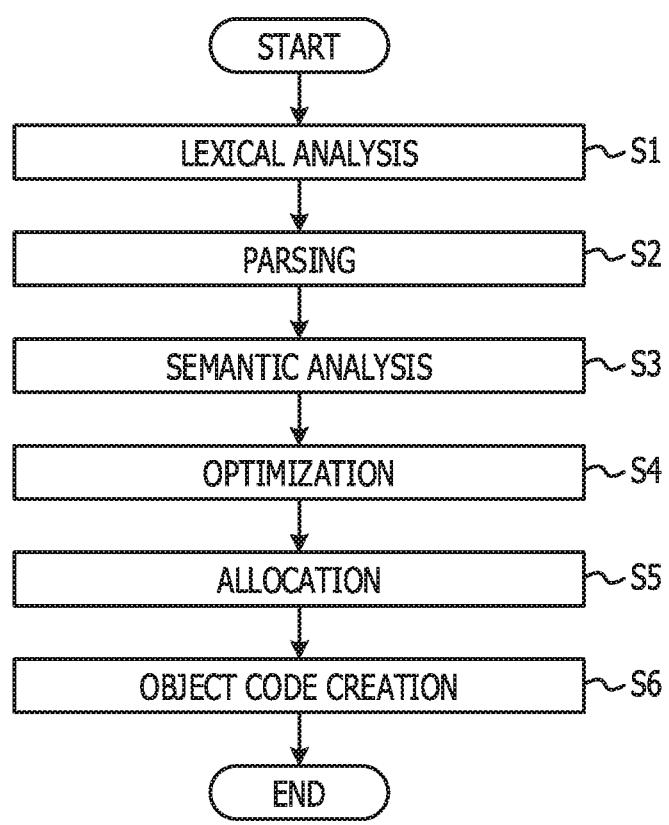
FIG. 7 is a flow diagram for explaining a flow of processing of a compile program.

FIG. 7 is a flow diagram for explaining a flow of a processing of a compile program. The compile program explained in FIG. 7 may be the compile program PG illustrated in FIG. 4. In the explanation of the flow diagram, Ss ("s" is an integer) indicates a step Ss.

Step S1: The lexical analyzing unit 11 reads out the source code SRC stored in the storage device 105 and loads the source code SRC into the RAM 102 to execute a lexical analysis on the loaded source code SRC.

Step S2: The parsing unit 12 analyzes whether the lexical elements divided in S1 comply with syntactic rules and creates parsing information.

Step S3: The semantic analyzing unit 13 creates intermediate information on the basis of the parsing information.

Step S4: The optimizing unit 14 converts the intermediate information to optimize the intermediate information.

Step S5: The allocating unit 15 executes register allocation on the basis of the intermediate information.

Step S6: The object creating unit 16 creates an object code.

Detailed Example

Next, a flow of a processing of a compile program will be described in detail with reference to FIGS. 8 to 13. The compile program explained here may be the compile program PG illustrated in FIG. 4. The compile program PG compiles the source code SRC in FIG. 4. The source code SRC includes the COBOL code CBS1 and the C language code CS1 illustrated in FIG. 1 for example.

(Lexical Analysis and Parsing)

Figure 8:
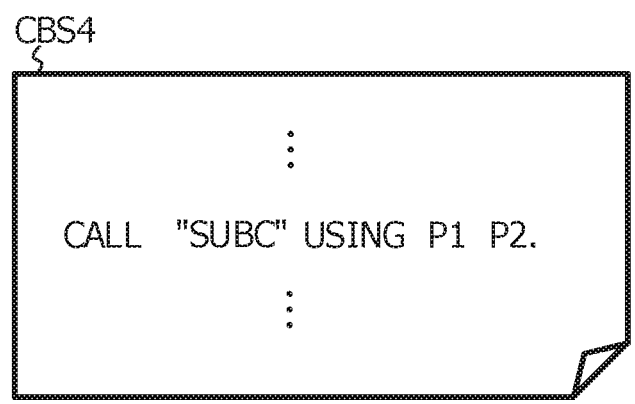
FIG. 8 illustrates one part of a source code in FIG. 4.
Figure 9:
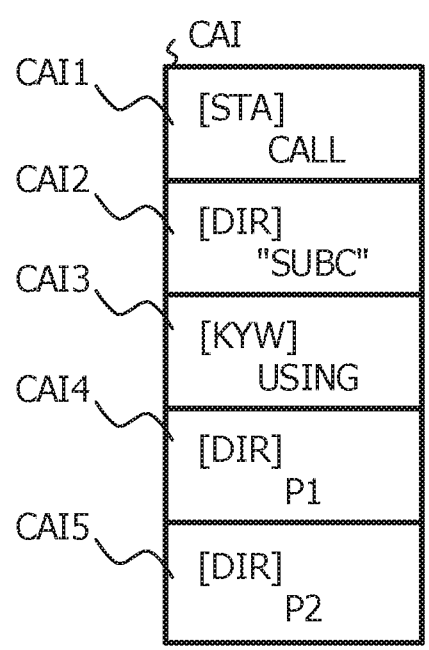
FIG. 9 illustrates one example of parsing information.

FIG. 8 illustrates one part of the source code SRC in FIG. 4. A code CBS4 is a code described by COBOL. Explanation of 'CALL "SUBC" USING P1 P2.' is omitted because the explanation has been made in FIG. 1 and so forth. FIG. 9 illustrates one example of parsing information.

The lexical analyzing unit 11 executes a lexical analysis on the source code SRC (S1 in FIG. 7). For example, the parsing unit 12 executes parsing about 'CALL "SUBC" USING P1 P2.' of the code CBS4 and creates parsing information CAI of FIG. 9 (S2 in FIG. 7).

For example, sequentially from the left of 'CALL "SUBC" USING P1 P2.' of the code CBS4, the lexical analyzing unit 11 splits 'CALL "SUBC" USING P1 P2.' into tokens (S1 in FIG. 7). Then, the parsing unit 12 analyzes the contents of each token in order of the splitting and creates the analysis result as the parsing information CAI. Information for the parsing is stored in the storage device 105 in advance.

In the parsing information CAI, [STA] indicates that the token is a statement. [DIR] indicates that the token is user data and [KYW] indicates that the token is a reserved word. In FIG. 9, [STA] in a frame indicated by symbol CAI1 indicates that the token "CALL" is a statement. [DIR] in a frame indicated by symbol CAI2 indicates that the token "SUBC" is user data. [KYW] in a frame indicated by symbol CAI3 indicates that "USING" is a reserved word. [DIR] in a frame indicated by symbol CAI4 indicates that the token "P1" is user data. [DIR] in a frame indicated by symbol CAI5 indicates that the token "P2" is user data.

As described above, the lexical analyzing unit 11 executes a lexical analysis about each of plural statements included in the COBOL source code SRC. Then, on the basis of the analysis result of the lexical analysis, the parsing unit 12 creates the parsing information of each of the plural statements. As the kinds of statements, there are various statements such as DISPLAY statement and IF-THEN statements for example.

(Semantic Analysis)

Figure 10:
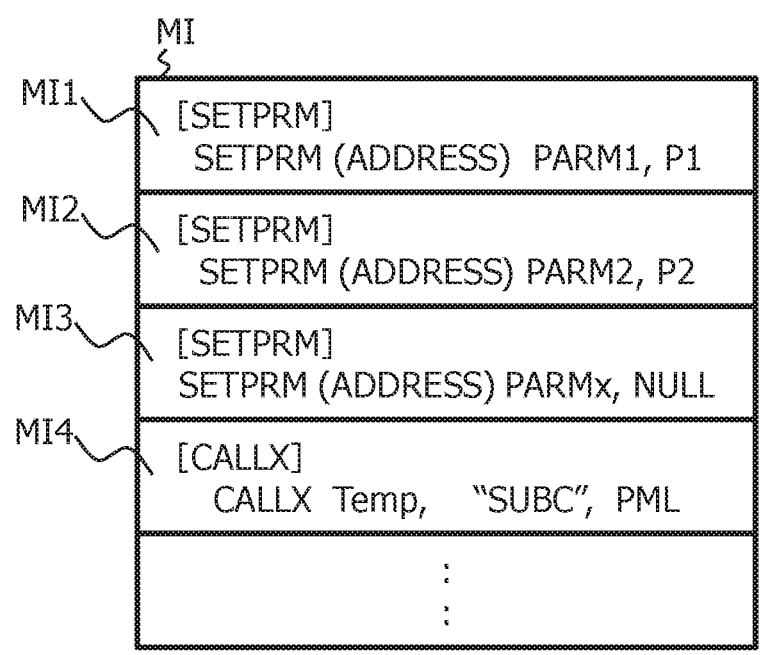
FIG. 10 is a diagram for explaining part of intermediate information created on the basis of parsing information.
Figure 11:
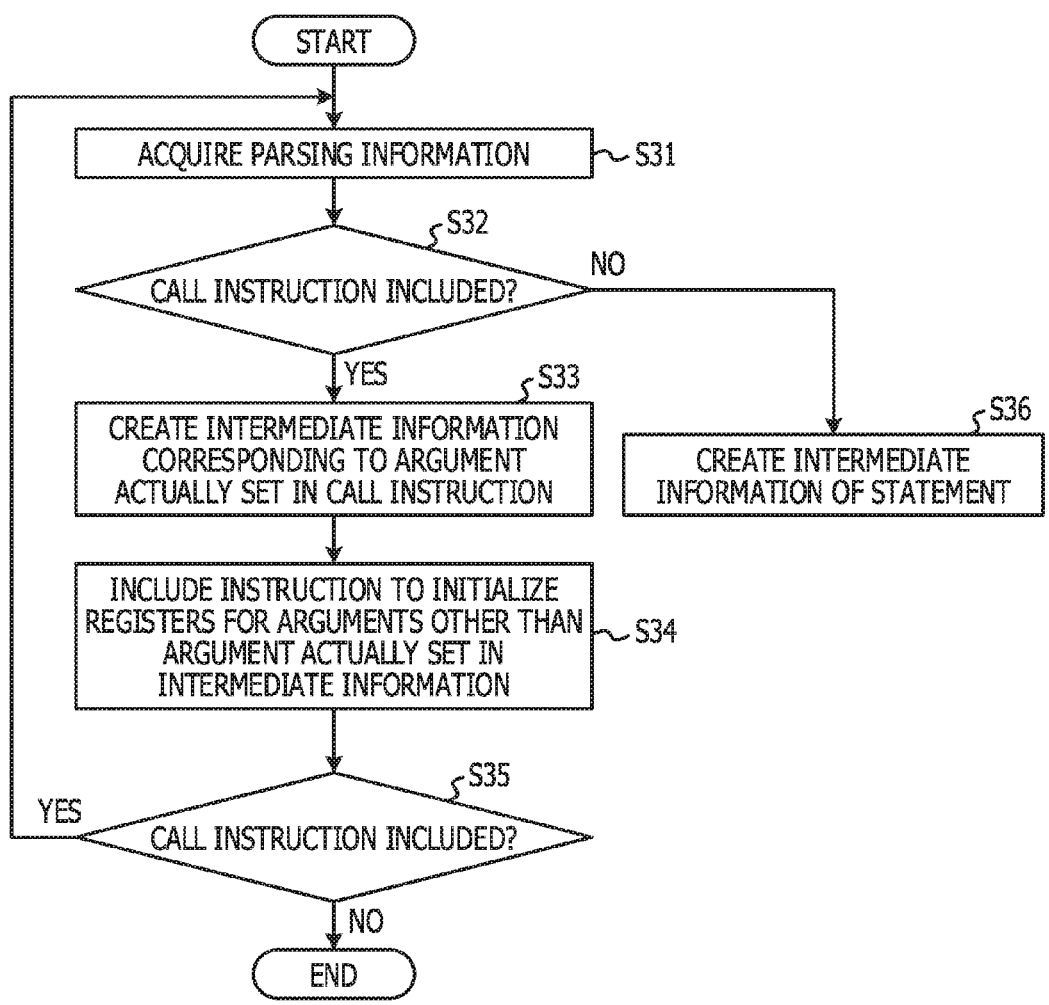
FIG. 11 is a flow diagram for explaining semantic analysis in FIG. 7.

Next, semantic analysis will be described with reference to FIGS. 9 to 11. FIG. 10 is a diagram for explaining part of intermediate information created on the basis of a parsing information. The parsing information explained in FIG. 10 may be the parsing information CAI illustrated in FIG. 9. FIG. 11 is a flow diagram for explaining the semantic analysis (S3) in FIG. 7.

Intermediate information MI of FIG. 10 is one example of intermediate information including an instruction to initialize registers for arguments of 'CALL "SUBC" USING P1 P2.' (see the code "CBS4" of FIG. 8).

"[SETPRM]" in the intermediate information MI is an instruction to set an argument in one entry of an argument list that is a set of arguments.

"[SETPRM] SETPRM (address) PARM1, P1" indicated by symbol MI1 is an instruction to set the address (pointer) of an argument "P1" in an entry of "PARM1." "[SETPRM] SETPRM (address) PARM2, P2" indicated by symbol MI2 is an instruction to set the address of an argument "P2" in an entry of "PARM2." "[SETPRM] SETPRM (address) PARMx, NULL" indicated by symbol MI3 is an instruction to set NULL in an entry of "PARMx." "x" is an integer equal to or larger than three. NULL is a null pointer (in other words, empty pointer). At the time of execution of a program, when reference to a null pointer is made, this program is force-quit for example.

"[CALLX]" in the intermediate information MI is an instruction to call an external program. This external program is a program described by the C language for example. '[CALLX] CALLX Temp, "SUBC," PML' indicated by symbol MI4 is an instruction to call a function "SUBC" of the external program, with PML (argument list) employed as arguments. "Temp" represents a temporary area to which the function "SUBC" of the external program returns a return value.

Next, the flow of the semantic analysis (S3) in FIG. 7 will be described with reference to FIG. 11.

Step S31: The semantic analyzing unit 13 acquires parsing information that has not yet been acquired from the pieces of parsing information of the respective statements of the source code SRC, stored in the RAM 102. The order of this acquisition is the order of creation of the parsing information for example. The semantic analyzing unit 13 acquires the parsing information CAI of FIG. 9 for example.

Step S32: The semantic analyzing unit 13 determines whether a call instruction is included in the acquired parsing information. The call instruction is the above-described "CALL" or "INVOKE" statement. For example, the semantic analyzing unit 13 determines whether "CALL" or "INVOKE" is included as "[STA]," which indicates that the token is a statement, in the acquired parsing information. If "CALL" or "INVOKE" is included as "[STA]," which indicates that the token is a statement, in the acquired parsing information, the semantic analyzing unit 13 determines that a call instruction is included in the acquired parsing information.

If a call instruction is not included in the acquired parsing information (S32/NO), the semantic analyzing unit 13 shifts the processing to a step S36. If a call instruction is included in the acquired parsing information (S32/YES), the semantic analyzing unit 13 shifts the processing to a step S33.

In the parsing information CAI of FIG. 9, "CALL" is included as "[STA]." Therefore, the semantic analyzing unit 13 determines that a call instruction is included in the acquired parsing information CAI.

Step S33: The semantic analyzing unit 13 creates intermediate information corresponding to arguments actually set in the call instruction on the basis of the acquired parsing information.

For example, the semantic analyzing unit 13 extracts arguments set in an external function called by the call instruction from the acquired parsing information. Then, the semantic analyzing unit 13 creates intermediate information including an instruction to set the address of this extracted argument in an entry corresponding to this argument. In this argument extraction, if "USING" is included as "[KYW]," which indicates that the token is a reserved word, in the acquired parsing information, the semantic analyzing unit 13 extracts a token that is described next to "[KYW]" and is user data as the argument. The character string indicating that the token is user data is "[DIR]" as described above.

In the example of FIG. 9, "USING" is included as "[KYW]," which indicates that the token is a reserved word, in the acquired parsing information CAI. Therefore, the semantic analyzing unit 13 extracts the tokens "P1" and "P2," which are described next to "[KYW]" and are user data, as the arguments. For example, the semantic analyzing unit 13 extracts the tokens "P1" and "P2" in the frames indicated by symbols CAI4 and CAI5 in FIG. 9 as the arguments.

Then, the semantic analyzing unit 13 creates intermediate information including instructions to set the addresses of these arguments in entries corresponding to these extracted arguments "P1" and "P2."

In the example of FIG. 10, the semantic analyzing unit 13 creates the intermediate information including the instruction to set the address of the argument "P1" in the entry of "PARM1" (see symbol "MI1" in FIG. 10) and the instruction to set the address of the argument "P2" in the entry of "PARM2" (see symbol "MI2" in FIG. 10). The addresses of these arguments "P1" and "P2" are addresses in the RAM provided in the computer for execution.

Furthermore, the semantic analyzing unit 13 includes an instruction to call an external program in this created intermediate information. For example, the semantic analyzing unit 13 extracts the name of a function called by the call instruction from the acquired parsing information. In this extraction, the semantic analyzing unit 13 extracts a token that is described next to the call instruction "CALL" or "INVOKE" and is user data as the function name.

Then, the semantic analyzing unit 13 creates an instruction to call the external program on the basis of the extracted function name. In the example of FIG. 9, the semantic analyzing unit 13 extracts the token "SUBC," which is described next to the call instruction "CALL" and is user data, as the function name. In the example of FIG. 10, the semantic analyzing unit 13 includes the instruction to call the function "SUBC" of the external program, with PML (argument list) employed as arguments (see symbol "MI4"), in the created intermediate information.

Step S34: The semantic analyzing unit 13 includes an instruction to initialize registers for arguments other than the argument actually set in the intermediate information created in S33.

In the examples of FIGS. 9 and 10, the arguments actually set in the function "SUBC" of the external program are "P1" and "P2." Therefore, the semantic analyzing unit 13 includes an instruction to initialize the registers for arguments other than the arguments "P1" and "P2" actually set in the intermediate information created in S33. The instruction to initialize the registers for arguments other than the arguments "P1" and "P2" actually set is the instruction to set a null pointer in the entry of "PARMx" (symbol "MI3").

In the examples of FIGS. 9 and 10, the intermediate information after the end of S34 is the intermediate information MI of FIG. 10.

Step S35: The semantic analyzing unit 13 determines whether parsing information that has not yet been acquired exists in the pieces of parsing information of the respective statements of the source code SRC, stored in the RAM 102. If parsing information that has not yet been acquired exists (S35/YES), the semantic analyzing unit 13 shifts the processing to S31. If parsing information that has not yet been acquired does not exist (S35/NO), the creation processing of the intermediate information (S3 in FIG. 7) ends, followed by transmission to the optimization processing (S4 in FIG. 7). The case in which parsing information that has not yet been acquired does not exist means that parsing information acquired immediately previously is the last parsing information.

Step S36: The semantic analyzing unit 13 creates intermediate information of the statement on the basis of the parsing information of this statement. The processing of S36 is processing generally executed by a compiler and therefore description thereof is omitted. The end of the processing of S36 is followed by transmission to S35.

When the creation processing of the intermediate information ends, the optimizing unit 14 executes various kinds of processing for optimization (S4 in FIG. 7).

As described above, when the compile program PG compiles the source code SRC described by a first programming language, the semantic analyzing unit 13 specifies a function described by a second programming language (for example "SUBC" of C language) from the source code SRC. For example, the first programming language is the COBOL and the second programming language is the C language.

In the specifying processing, if a statement that is stored in the storage device 105 or the like in advance and calls a function corresponds with a statement described in the source code SRC, the semantic analyzing unit 13 specifies a function (for example "SUBC" of C language) in the statement described in the source code SRC. The statement that is stored in advance and calls a function is the above-described information for parsing and is indicated by a character string "CALL" or "INVOKE" for example.

(Allocation)

After the optimization, the allocating unit 15 executes register allocation on the basis of the intermediate information created in S3 in FIG. 7 (S5 in FIG. 7). The allocation will be described with reference FIGS. 10, 12, and 13.

Figure 12:
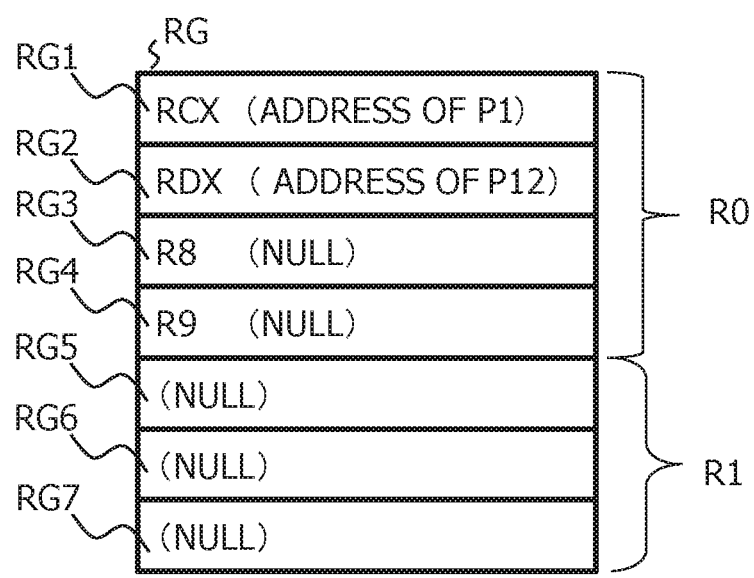
FIG. 12 schematically illustrates register arguments and stack arguments.
Figure 13:
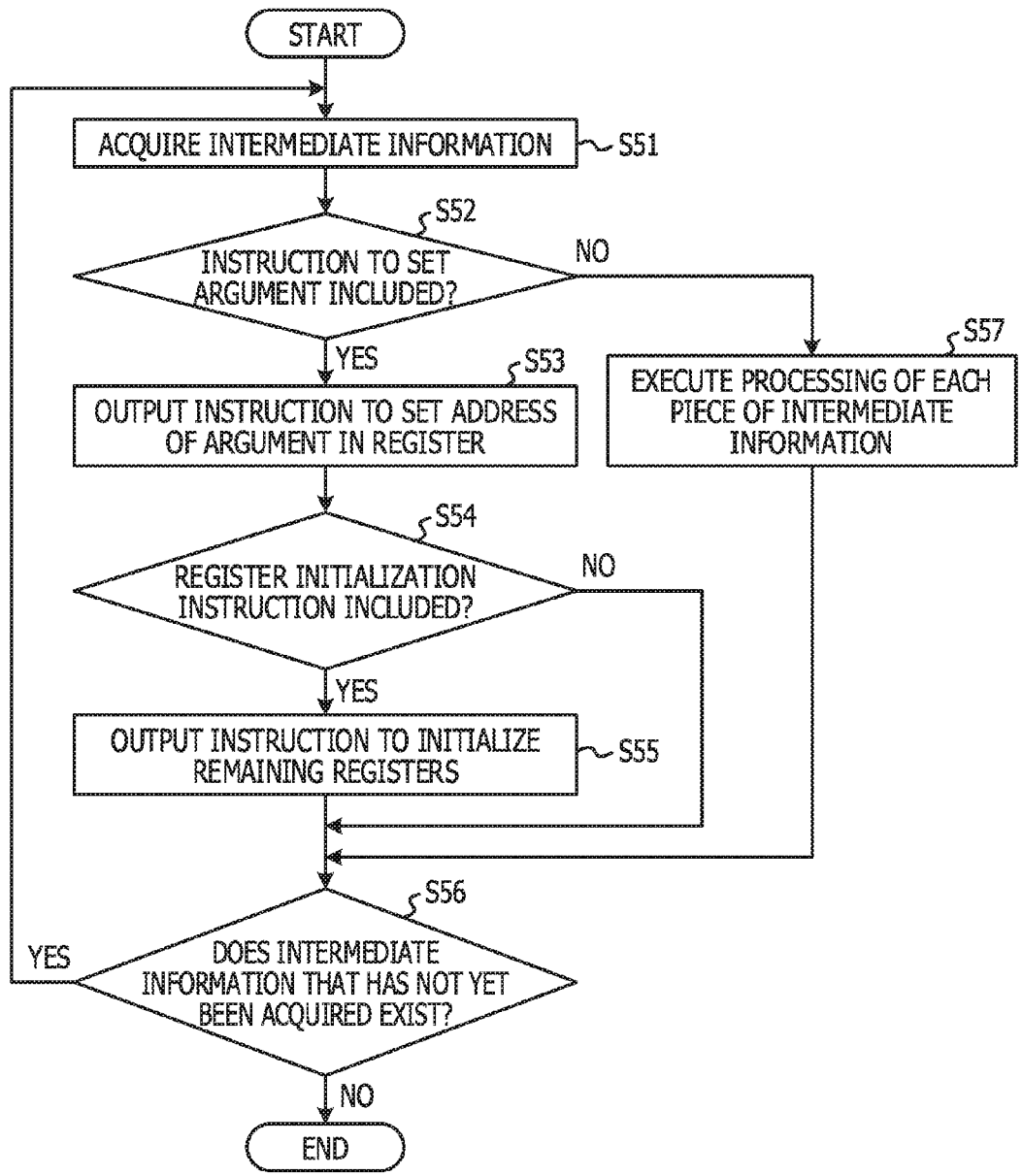
FIG. 13 is a flow diagram for explaining allocation in FIG. 7.

FIG. 12 schematically illustrates register arguments and stack arguments. FIG. 13 is a flow diagram for explaining the allocation (S5) in FIG. 7.

In FIG. 12, a register group RG schematically represents one part of the registers for arguments. The register group RG for arguments in FIG. 12 exemplifies the case in which "n" is 7 in FIG. 5. FIG. 12 represents that the address of the argument "P1" is stored (set) in a register RG1. Moreover, FIG. 12 represents that the address of the argument "P2" is stored in a register RG2.

FIG. 12 represents that a null pointer (NULL) is stored in each of registers RG3 to RG7. Next, the flow of the allocation (S5) in FIG. 7 will be described with reference to FIG. 13.

Step S51: The allocating unit 15 acquires intermediate information that has not yet been acquired from the pieces of intermediate information of the respective statements of the source code SRC, stored in the RAM 102. The order of this acquisition is the order of creation of the intermediate information for example. The allocating unit 15 acquires the intermediate information MI of FIG. 10 for example.

Step S52: The allocating unit 15 determines whether an instruction to set an argument is included in the acquired intermediate information. For example, the allocating unit 15 determines whether [SETPRM] is included in the acquired intermediate information. If [SETPRM] is included in the acquired intermediate information, the allocating unit 15 determines that an instruction to set an argument is included in the acquired intermediate information.

If an instruction to set an argument is not included in the acquired intermediate information (S52/NO), the allocating unit 15 shifts the processing to a step S57. If an instruction to set an argument is included in the acquired intermediate information (S52/YES), the allocating unit 15 shifts the processing to a step S53.

In the intermediate information MI of FIG. 10, "[SETPRM]" is included. Therefore, the allocating unit 15 determines that an instruction to set an argument is included in the acquired intermediate information MI.

Step S53: On the basis of the intermediate information acquired in S51, the allocating unit 15 outputs, to the object creating unit 16, an instruction to store the address of the argument actually set in a call instruction of an external function in the register for this argument. The argument actually set in a call instruction of an external function is the argument actually set in this external function.

In the example of the intermediate information MI of FIG. 10, the allocating unit 15 outputs an instruction to store the address of the argument "P1" in the register for the argument "P1" (hereinafter, referred to as "instruction 1") to the object creating unit 16. Instruction 1 includes an instruction to ensure an area for the argument "P1" in the register of the computer for execution. This area is the area in the register group RG indicated by symbol RG1 in FIG. 12. The register group RG of FIG. 12 is the register of the computer for execution. The computer for execution is a computer that executes the execution file of the source code SRC.

Furthermore, in the example of the intermediate information MI of FIG. 10, the allocating unit 15 outputs an instruction to store the address of the argument "P2" in the register for the argument "P2" (hereinafter, referred to as "instruction 2") to the object creating unit 16. Instruction 2 includes an instruction to ensure an area for the argument "P2" in the register of the computer for execution. This area is the area in the register group RG indicated by symbol RG2 in FIG. 12.

Due to these two instructions 1 and 2, as illustrated in FIG. 12, the computer for execution stores the address of the argument "P1" in the register for the argument "P1" (see the register "RG1" in FIG. 12) and further stores the address of the argument "P2" in the register for the argument "P2" (see the register "RG2" in FIG. 12) at the time of execution of the function "SUBC."

Step S54: The allocating unit 15 determines whether an instruction to initialize registers for arguments other than the argument actually set is included in the intermediate information acquired in S51. The case in which an instruction to initialize registers for arguments other than the argument actually set is included in the intermediate information acquired in S51 is the case in which an instruction to set a null pointer in a certain entry is included in the intermediate information acquired in S51. For example, the case is the case in which information indicating NULL is included in the intermediate information acquired in S51.

If the above-described instruction for initialization is not included (S54/NO), the allocating unit 15 shifts the processing to S56. If the above-described instruction for initialization is included (S54/YES), the allocating unit 15 shifts the processing to S55.

In the example of the intermediate information MI of FIG. 10, information indicating NULL is included in the intermediate information MI acquired in S51. Therefore, the allocating unit 15 makes the determination result as YES in S54.

Step S55: The allocating unit 15 outputs an instruction to initialize the remaining registers to the object creating unit 16. For example, the allocating unit 15 outputs an instruction to initialize the registers for arguments other than the argument actually set (hereinafter, referred to as "instruction 3" as appropriate) to the object creating unit 16. This initialization is processing of storing null pointers (NULL) in the registers.

Instruction 3 includes an instruction to ensure areas for arguments other than the arguments "P1" and "P2" actually set in the register of the computer for execution. These areas are the areas in the register group RG indicated by symbols RG3 to RG7 in FIG. 12.

In the example of FIG. 10, the allocating unit 15 outputs an instruction to initialize the registers for arguments other than the arguments "P1" and "P2" actually set to the object creating unit 16. Due to this instruction, as illustrated in FIG. 12, the computer for execution stores null pointers in the registers RG3 to RG7 for arguments other than the arguments "P1" and "P2" actually set (see "(NULL)" in the registers RG3 to RG7 in FIG. 12) at the time of execution of the function "SUBC."

Step S56: The allocating unit 15 determines whether intermediate information that has not yet been acquired exists in the pieces of intermediate information of the respective statements of the source code SRC, stored in the RAM 102. If intermediate information that has not yet been acquired exists (S56/YES), the allocating unit 15 shifts the processing to S51. If intermediate information that has not yet been acquired does not exist (S56/NO), the allocation processing ends, followed by transmission to the object code creation processing (S6). The case in which intermediate information that has not yet been acquired does not exist means that intermediate information acquired immediately previously is the last intermediate information.

Step S57: On the basis of each piece of intermediate information, the allocating unit 15 executes allocation on the intermediate information. The processing of S57 is processing generally executed by a compiler and therefore description thereof is omitted. When the processing of S57 ends, the allocating unit 15 shifts the processing to S56.

As described above, the allocating unit 15 creates an instruction to store given data in a register area for a second argument that is an argument other than a first argument set in an external function and is not set in the external function, and outputs the instruction to the object creating unit 16 (step S55).

This external function is the external function "SUBC" specified by the semantic analyzing unit 13 for example. Furthermore, the first arguments set in the external function are the argument "P1" and the argument "P2" for example. The given data is data with which an error is caused when the register area is accessed due to execution of the external function, and is a null pointer (null value) for example. This error is force-quit for example.

Here, the register area is an area in the register in which an address (pointer) indicating an area in which data of an argument is stored is stored. This area in which data of an argument is stored is an area in the RAM of the computer for execution. Furthermore, this register is the register of the computer for execution.

Before the creation of the above-described instruction, the allocating unit 15 creates an instruction to ensure a first area for the first argument and a second area for the second argument in the register, and outputs the instruction to the object creating unit 16. In the example of FIG. 12, the first area for the first argument is the registers RG1 and RG2. Furthermore, in the example of FIG. 12, the second area for the second argument is the registers RG3 to RG7.

Furthermore, the allocating unit 15 creates an instruction to store, in the first area, an address indicating a memory area in which data of the above-described first argument is stored, and outputs the instruction to the object creating unit 16. Moreover, the allocating unit 15 creates an instruction to store a null pointer in the second area and outputs the instruction to the object creating unit 16.

(Creation of Object Code)

When the allocation processing ends, the object creating unit 16 creates an object code and stores the object code in the RAM 102 (S6 in FIG. 7).

The object creating unit 16 executes the following processing if the instruction to store the address of the argument actually set in the call instruction of the external function in the register for this argument is output (see the step S53). For example, the object creating unit 16 includes, in the object code, an instruction command to store the address (pointer) of the argument actually set in the call instruction of the external function in the register for this argument (hereinafter, referred to as the "first instruction command" as appropriate).

In the example of FIG. 12, the first instruction command is an instruction command to store the address of the argument "P1" in the register RG1 for the argument "P1" and store the address of the argument "P2" in the register RG2 for the argument "P2."

The object creating unit 16 executes the following processing if the instruction to initialize the registers for arguments other than the argument actually set is output (see the step S55). For example, the object creating unit 16 includes, in the object code, an instruction command to store null pointers in the registers for arguments other than the argument actually set (hereinafter, referred to as the "second instruction command" as appropriate).

In the example of FIG. 12, the second instruction command is an instruction command to store null pointers in the registers (RG3 to RG7) for arguments other than the arguments "P1" and "P2" actually set.

(Execution File)

Thereafter, the compile program PG links the created object code and creates an execution file to store the execution file in the storage device 105 for example. This execution file is an execution file of the source code SRC including the COBOL code CBS1 and the C language code CS1. This execution file includes the above-described first instruction command and second instruction command.

A person who carries out quality control of the program (referred to also as a "tester") makes the computer for execution (e.g. compile device 1) execute this execution file to check whether this execution file involves a defect.

In this execution, the function "SUBC" (see FIG. 1) is called and executed. In this execution, the computer for execution executes the above-described first instruction command. By the execution of the first instruction command, as illustrated in FIG. 12, the computer for execution ensures the register RG1 for the first argument and the register RG2 for the second argument to store the address of the argument "P1" in the register RG1 and store the address of the argument "P2" in the register RG2.

Moreover, the computer for execution executes the second instruction command to ensure the register RG3 to the register RG7 and store null pointers in the register RG3 to the register RG7.

After the end of the above-described setting, the computer for execution executes the function "SUBC" (see FIG. 1). As described with FIG. 1, the function "SUBC" sets the value resulting from addition of the variable "p3" and "10" in the variable "p3" (argument "p3") (see "*p3=*p3+10;"). In order to execute this addition processing, the computer for execution accesses the register RG3, in which the address (pointer) of the variable "p3" is stored.

Here, the null pointer is stored in the register RG3. Therefore, when the computer for execution accesses this register RG3 and refers to the memory area indicated by the null pointer (in other words, area in the RAM), force-quit is caused.

As above, if a mismatch exists between the number of arguments set in calling the external function "SUBC" and the number of arguments desired to be set in the external function "SUBC," force-quit is caused when the external function "SUBC" is executed. Therefore, when force-quit is caused due to calling of the external function, if a developer of the program checks whether or not the above-described mismatch exists, the developer can easily check that the cause of the force-quit is the above-described mismatch. As a result, identification of the cause of the failure can be made easy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of compiling a source code described by a first programming language, the method being executed by a computer and comprising:
    specifying a function from the source code, the function being described by a second programming language different from the first programming language, the function being allowed to use one or more arguments; and
    first creating an instruction to store given data that causes occurrence of an error when a register is accessed due to execution of the function, and storing the given data that causes occurrence of the error in an area in the register for an argument that is not set for the function in the source code among the one or more arguments.

2. The method according to claim 1, wherein
    the register stores an address indicating an area in which data of a corresponding argument is stored,
    the one or more arguments include a first argument set in the function in the source code and a second argument not set for the function in the source code,
    the method further comprises:
        second creating an instruction to ensure a first area for the first argument and a second area for the second argument in the register prior to the first creating; and
        third creating an instruction to store, in the first area, an address indicating an area in which data of the first argument is stored, and
    the first creating creates the instruction to store the given data in the second area.

3. The method according to claim 1, wherein
    the specifying specifies the function in a statement described in the source code when the statement described in the source code corresponds with a statement registered in advance.

4. The method according to claim 1, wherein the given data is a null value.

5. A non-transitory storage medium storing a compile program for compiling a source code described by a first programming language, the compile program causing a computer to execute a process, the process comprising:
    specifying a function from the source code, the function being described by a second programming language different from the first programming language, the function being allowed to use one or more arguments; and
    first creating an instruction to store given data that causes occurrence of an error when a register is accessed due to execution of the function, and storing the given data that causes occurrence of the error in an area in the register for an argument that is not set for the function in the source code among the one or more arguments.

6. The non-transitory storage medium according to claim 5, wherein
    the register stores an address indicating an area in which data of a corresponding argument is stored,
    the one or more arguments include a first argument set in the function in the source code and a second argument not set for the function in the source code,
    the process further comprises:
        second creating an instruction to ensure a first area for the first argument and a second area for the second argument in the register prior to the first creating; and
        third creating an instruction to store, in the first area, an address indicating an area in which data of the first argument is stored, and
    the first creating creates the instruction to store the given data in the second area.

7. The non-transitory storage medium according to claim 5, wherein
    the specifying specifies the function in a statement described in the source code when the statement described in the source code corresponds with a statement registered in advance.

8. The non-transitory storage medium according to claim 5, wherein the given data is a null value.

9. An apparatus configured to compile a source code described by a first programming language, the apparatus comprising:

a memory; and a processor coupled to the memory and configured to:

specify a function from the source code, the function being described by a second programming language different from the first programming language from the source code, the function being allowed to use one or more arguments, and create an instruction to store given data that causes occurrence of an error when a register is accessed due to execution of the function, and store the given data that causes occurrence of the error in an area in the register for an argument that is not set for the function in the source code among the one or more arguments.

10. The apparatus according to claim 9, wherein the register stores an address indicating an area in which data of a corresponding argument is stored, the one or more arguments include a first argument set in the function in the source code and a second argument not set for the function in the source code, and the processor is configured to:

create an instruction to ensure a first area for the first argument and a second area for the second argument in the register prior to the creating of the instruction to store the given data causing occurrence of the error, create an instruction to store, in the first area, an address indicating an area in which data of the first argument is stored, and create the instruction to store the given data in the second area.

11. The apparatus according to claim 9, wherein the processor is configured to:

specify the function in a statement described in the source code when the statement described in the source code corresponds with a statement registered in advance.

12. The apparatus according to claim 9, wherein the given data is a null value.

* * * * *